United States Patent
Wu

(10) Patent No.: US 6,196,435 B1
(45) Date of Patent: Mar. 6, 2001

(54) SHEET-OR-TISSUE DISPENSER-BOX HOLDER FOR CLINIC, VEHICLE, FACTORY OR HOUSEHOLD APPLICATIONS

(76) Inventor: Charles Wu, 1469 Abajo Dr., Monterey Park, CA (US) 91754

( * ) Notice: Subject to any disclaimer, the term of this patent is extended or adjusted under 35 U.S.C. 154(b) by 0 days.

(21) Appl. No.: 09/318,177

(22) Filed: May 25, 1999

(51) Int. Cl.$^7$ ........................................ B60R 7/06
(52) U.S. Cl. .................................. 224/572; 224/901.8
(58) Field of Search ........................... 224/572, 559, 224/562, 329, 315, 901.8; 221/22, 33, 45, 46, 52; D6/518; D9/337; 428/100

(56) References Cited

U.S. PATENT DOCUMENTS

| | | | |
|---|---|---|---|
| 2,024,884 | * 12/1935 | Schlegel | 224/572 X |
| 2,252,616 | * 8/1941 | Broeren et al. | 221/52 X |
| 4,967,988 | * 11/1990 | Nguyen | 224/483 X |
| 5,553,733 | * 9/1996 | Rosenthal | 428/35.2 |
| 5,672,186 | * 9/1997 | Chesley et al. | 428/100 X |

FOREIGN PATENT DOCUMENTS

2442497 * 6/1980 (FR) .
2185948 * 8/1987 (GB) .

* cited by examiner

*Primary Examiner*—Renee Luebke
(74) *Attorney, Agent, or Firm*—Richard E. Bee

(57) ABSTRACT

A sheet material dispenser box holder, such as a cosmetic tissue box holder, is made up of elastic cord or strap material in a woven fish-net pattern forming a bag shaped container closed at the top except for an access opening, facilitating easy placement of a tissue box, inside the bag shaped box holder, such box holder having diverse attachment patches for retaining the box holder in position where it will remain reliably in any attitude of a vehicle or surface to which it is mounted while readily allowing removal of individual tissue sheets.

2 Claims, 2 Drawing Sheets

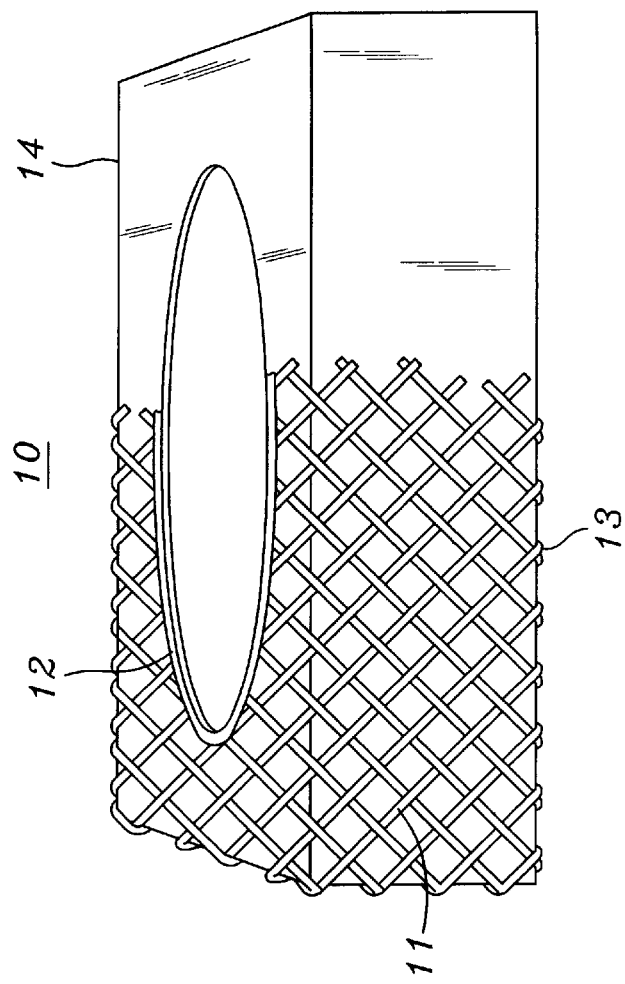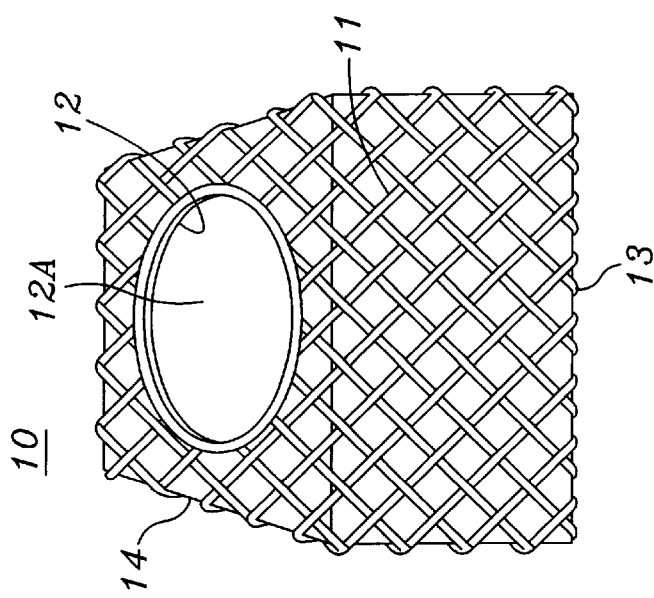

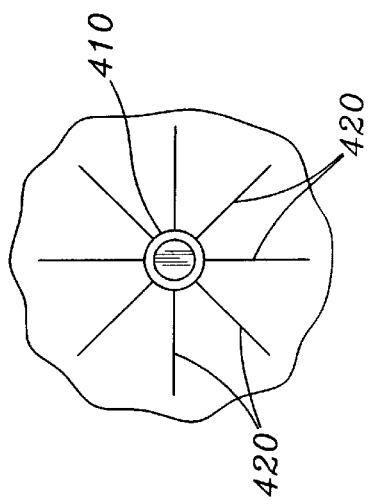
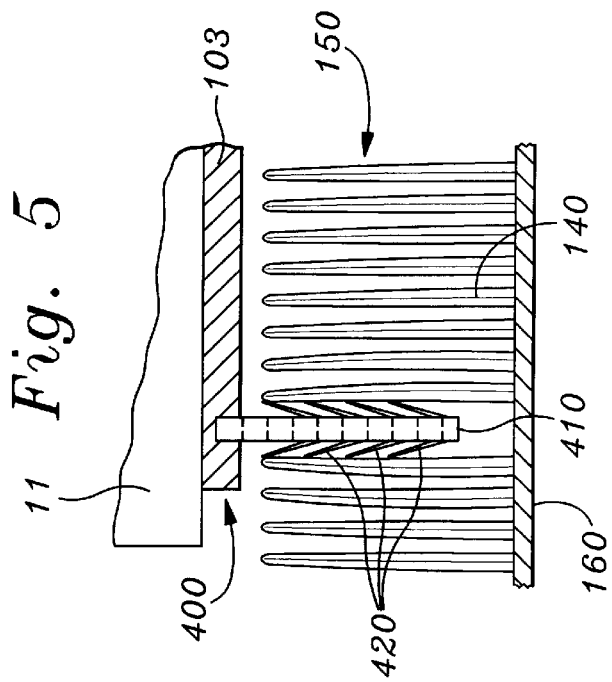
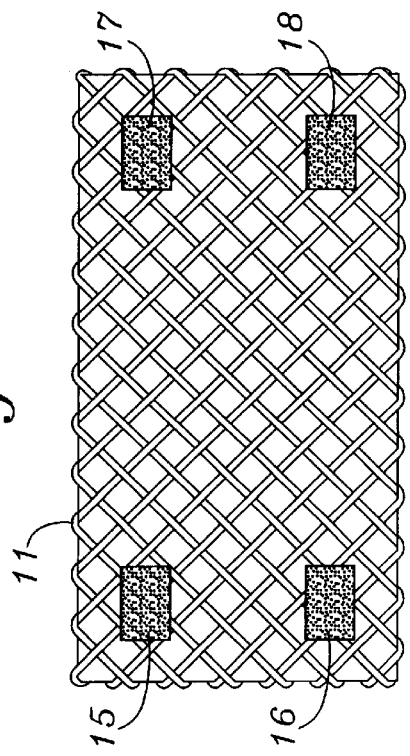
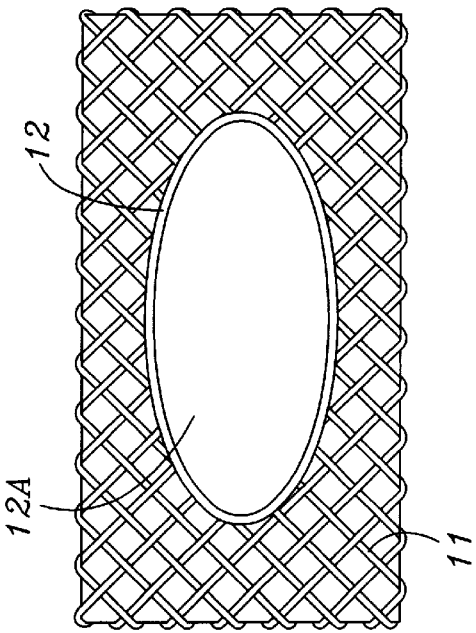

SHEET-OR-TISSUE DISPENSER-BOX HOLDER FOR CLINIC, VEHICLE, FACTORY OR HOUSEHOLD APPLICATIONS

BACKGROUND OF THE INVENTION

1. Field of the Invention

This invention relates to dispensers for fast access to sheet materials such as absorbing, wiping, cleaning and polishing sheets and more particularly to cosmetic tissue dispensers and dispensers which are desired to be stationary when located in a vehicle that is subject to roll, pitch, or yaw movements such as might be encountered in an automobile, boat, aircraft, or spacecraft.

Prior to this invention it has been difficult to hold a tissue box stationary with tissues within reach of an individual whose attention is focused on some more important task. This invention relates to means for holding such sheet material dispenser readily accessible to the user in virtually any environment and position.

2. Description of the Prior Art

The prior art does not suggest a universally applicable sheet dispenser box mountable in a wide variety of places for containing readily available boxed sheets, in any position, and rigidly enough to allow drawing the sheets out in sequence without displacement of the dispenser box. The prior art does not teach a holder that is expandable and conformable to hold various shapes and sizes of dispenser boxes, nor does it provide a holder that is not rigid and can be compressed and stored in a pocket when not in use.

BRIEF DESCRIPTION OF THE INVENTION

In accordance with the invention, a tissue dispenser box holder is made up of stretchable cord or strap material arranged in a fish-net bag-like form with a draw-string or elastic molding joining the ends of the straps such that there is a stretchable opening to accommodate insertion of any common-size dispenser box into the bag. Attachment means, such as fish-hooks attached to the bag hook-and-loop patches, magnets, glue patches specially designed upholstery grabbers or two-sided carpeting tape can be used to attach the box holder to a wide variety of surface types. In certain environments it is desirable to attach the holder to a base which can be a weight for preventing movement or the dispenser. For most tissue boxes a pull of 2 grams is sufficient to remove individual tissues, therefore a base heavy enough to overcome this force is all that is required to anchor the dispenser by means of gravity. The type of attachment means needed depends on the specific application.

In an embodiment using a base the elastic material can be fastened at both ends in a woven pattern forming a cloth which then is formed into a bag shaped container closed at the top except for an access opening that is preferably oval in shape. Because the straps are stretchable, a dispenser box such as a common tissue box containing stacked, interfolded sheets, the opening at the top can be enlarged by stretching to insert the dispenser box, and used to access the contents of the box. The stretchable molding surrounding the preferably oval-shaped opening at the top terminates the straps or cords at the top. It will be noted that the stretchable nature of the dispenser box holder can accommodate dispenser boxes of many shapes, for example square, rectangular, round, etc. The contents can be accessed from the opening at the top, or the opening can be differently directed by attaching the holder on a side to mounting surface.

A very important feature of the new combination invention is the method and means for retaining the dispenser box in a position where it will remain reliably in any attitude in the vehicle in which it is mounted. For hard surfaces, two-sided carpeting tape patches or strips can be placed on the holder and the holder pressed on the structure to which it will be constrained.

For attachment to fabric, a patch consisting of adhesive material having hook elements extending therefrom, catch the strands of the fabric to hold the dispenser holder to the fabric surface which may be, for example, automobile interior carpeting. The hooks are advantageous for an installation that accommodates a pull direction perpendicular, or at any angle to a carpeted or fabric upholstered mounting surface to which the holder can be attached. A plurality of patches containing bristle-hook elements such as shown in FIG. 5 are used for deep piles. These are mounted on a base that can be secured inside or outside the holder bag. When the holder is pressed against the pile or web, tiny bristle-like members extending from molded-plastic shaft members grab the carpet pile and resist, pull-away of the holder from the carpet. A plurality of suction cup patches may also be used to attach the holder to a metal or other hard smooth surface.

BRIEF DESCRIPTION OF THE DRAWINGS

FIG. 1 is an endwise perspective view of the reusable, compressible and storable dispenser box holder of the invention made of elastic cord or strap material in which a dispenser box is placed, ready for dispensing tissues.

FIG. 2 is a side perspective view of the dispenser box of FIG. 1 with the elastic cord material partially removed.

FIG. 3 is a top view of the dispenser box holder of FIG. 2 showing the aperture on the top and molding terminating the elastic members.

FIG. 4 is a view bottom of the holder showing representative positions of the attachment means.

FIG. 5 is a partially cross-sectional illustration of a pile-grabber bristle-hook attachment patch.

FIG. 6 is a bottom view of the bristle hook shaft and bristles of FIG 5.

DESCRIPTION OF THE PREFERRED EMBODIMENTS

Referring now to FIG. 1, there is shown a three dimensional view of the dispenser box holder 10 with stretchable woven cord netting material 11. Elastic molding material 12 is sewn onto the woven material 11 and is cut to form the dispensing aperture 12A. Alternatively, an elastic drawstring can be used instead of a molding sewn on the ends of the cords. Functionally, the dispenser box holder 10 consists of a box cover 11 for a tissue dispenser box 14 containing stacked sheet material. The holder 10 includes attachment patches 15–18 (FIG. 4) for attaching the box cover 11 and box 14 to a plurality of support surface types. The stretchable net-like bag 11 can be conformed to any shape tissue dispenser box by inserting the box 14 into the bag 11 through the aperture 12A such that the tissues in the box 14 can be accessed through the opening 12A which is bonded by the molding 12.

It should be noted that the invention is a new combination invention wherein a sheet dispenser box 14 can be inserted into a net bag 11 through the opening 12A at the top of the bag 11 and bounded by the molding 1. A plurality of attachment means 15, 16, 17, 18, singly or simultaneously secured to the bottom portion 13 of the box cover 11 enable the attachment of the dispenser box holder 10 to a support surface. Representative attachment means include, for example, magnetic strip, suction cup, fish hook, hook-and-loop, two-sided glue tape and other well known anchoring means for resisting both lateral and vertical pulls. Possible attachment means also include a novel pile hook structure as shown in FIG. 5. The dispenser box holder 10 is attached to a desired support surface by exerting pressure on the holder 11 and pressing attachment means 15–18 against the mounting surface, enabling the attachment of the tissue box 14 and drawing of dispenser tissue sheets from the box 14. These attachment means can be applied singly, depending upon the support surface to which it is to be attached, or in combination to increase the effectiveness of the attachment to the support condition encountered.

FIGS. 3 and 4 show views of the top and bottom respectively of the dispenser box holder 10 of FIG. 2 showing the patches 15, 16, 17, and 18, containing means for attaching the box holder 10 to the support surface, which may be, for example, of the metal, smooth plastic, rough finish plastic, fabric, glass, upholstery, carpeting, magnetic or wet surfaces. Glue sticking patches, or hook and loop patches for removability, may be used for hard surfaces. It is apparent that, patches having adhesive thereon can offer sufficient anchoring to smooth surfaces. For easy removability, hook-and-loop mating tape, for example, VELCRO brand attachment tape can be used for smooth surfaces. Hard or smooth surfaces present no problem, but fabric and pile-type coverings present a challenge that is addressed by the present invention.

FIG. 5 shows a representation of a horizontal piece of webbed pile carpeting 150 and a novel pile grabber attachment means 400 affixed to the box cover 11 for hooking onto and grabbing the carpeting 150. The carpeting 150 includes carpet strands 140 attached to a mat 160. The attachment means 400 consists of a plastic base member 103 in which are molded or otherwise mounted a multiplicity of pile-grabber-hook elements consisting of multiple shaft members 410 having upwardly slanted, flexible wire elements 420 attached thereto such that when the attachment means 400 is pressed into the carpeting pile 140, the pile grabber elements 420 hook onto the pile strands 140 of the carpeting 150, resisting any attempt to pull the tissue box holder 10 from the carpeting 150.

While the preferred embodiments of the present invention have been described herein above, it is intended that all matter contained in the above description and shown in the drawings be interpreted as illustrative and not in a limiting sense and that all modifications, constructions, and arrangements that fall within the scope and spirit of the invention be considered as having been made.

What is claimed is:

1. A stretchable, storable and reusable holder for a tissue dispenser box, such holder comprising:

a box cover comprising a plurality of cords arranged in a fish-net pattern and forming a container having a top opening for receiving and enclosing a tissue dispenser box;

and at least one attachment means affixed to the box cover for attaching the box cover to a support surface;

whereby a tissue dispenser box can be inserted into the box cover through the top opening for enabling the dispenser box to be held in place on the support surface by the attachment means for enabling tissues to be withdrawn from the dispenser box, the box cover being compressible for storage when not in use;

wherein the attachment means is for use on surfaces covered with pile-type carpet or upholstery material, such attachment means comprising:

a base member which is attached to an underside of the box cover;

a plurality of shaft members attached to the base member and extending downwardly therefrom;

and a plurality of pile grabber elements attached to each shaft member and extending outwardly therefrom.

2. A tissue dispenser box holder in accordance with claim 1 wherein the pile grabber elements comprise wire bristles which slant upwardly toward the base member.

* * * * *